United States Patent [19]

Ito et al.

[11] Patent Number: 4,978,486
[45] Date of Patent: Dec. 18, 1990

[54] METHOD FOR PREPARING PERFORATED FILM

[75] Inventors: Michiyasu Ito, Kuwana; Toshiyuki Ishii, Kasugai; Shuji Matumura, Nagoya; Hajime Mushika, Niwa; Tomohide Tanaka, Nagoya, all of Japan

[73] Assignee: Mitsui Toatsu Chemicals, Incorporated, Tokyo, Japan

[21] Appl. No.: 234,106

[22] Filed: Aug. 19, 1988

[30] Foreign Application Priority Data

Aug. 20, 1987 [JP] Japan ................................ 62-204993
Aug. 20, 1987 [JP] Japan ................................ 62-204994

[51] Int. Cl.$^5$ ...................... B29C 67/20; B29C 59/04
[52] U.S. Cl. .................................... 264/41; 264/145; 264/154; 264/156; 264/284; 264/DIG. 47
[58] Field of Search ............... 264/154, 156, DIG. 47, 264/284, 41, 145

[56] References Cited

U.S. PATENT DOCUMENTS

| | | | |
|---|---|---|---|
| 3,227,854 | 1/1966 | Ramsey et al. | 264/156 |
| 3,243,488 | 3/1966 | Hannauer, Jr. et al. | 264/156 |
| 3,496,260 | 2/1970 | Guenther et al. | 264/156 |
| 3,649,611 | 3/1972 | Okumura et al. | 264/DIG. 47 |
| 3,775,521 | 11/1973 | Yamamoto et al. | 264/45.3 |
| 4,272,473 | 6/1981 | Riemersma et al. | 264/154 |
| 4,472,328 | 9/1984 | Sugimoto et al. | 264/147 |
| 4,793,956 | 12/1988 | Nogiwa et al. | 264/154 |
| 4,797,246 | 1/1989 | Reinke et al. | 264/154 |

*Primary Examiner*—James Lowe
*Attorney, Agent, or Firm*—Millen, White & Zelano

[57] ABSTRACT

A method for preparing a perforated film, for use in the field of sanitary, food packaging and industrial materials, by thermally embossing an oriented polyolefin film with an embossing roll having a large number of protruding knobs and a pinch roll which presses the film against the knobs, and simultaneously taking up the resultant film at a rate not less than the processing speed of the embossing roll.

17 Claims, 1 Drawing Sheet

F I G. 1
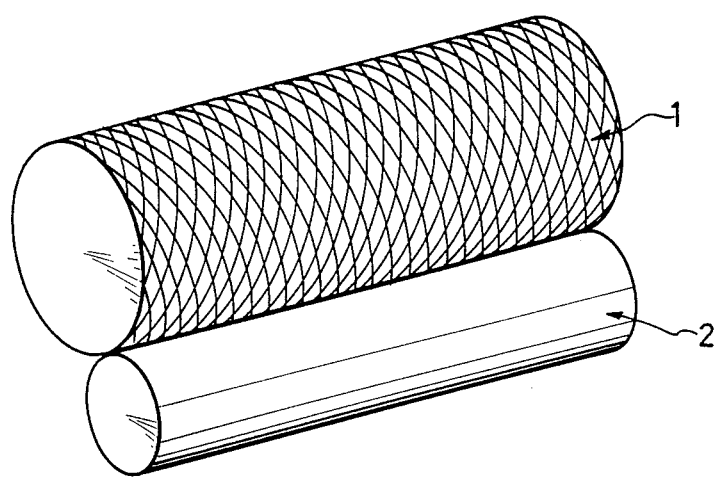
F I G. 2
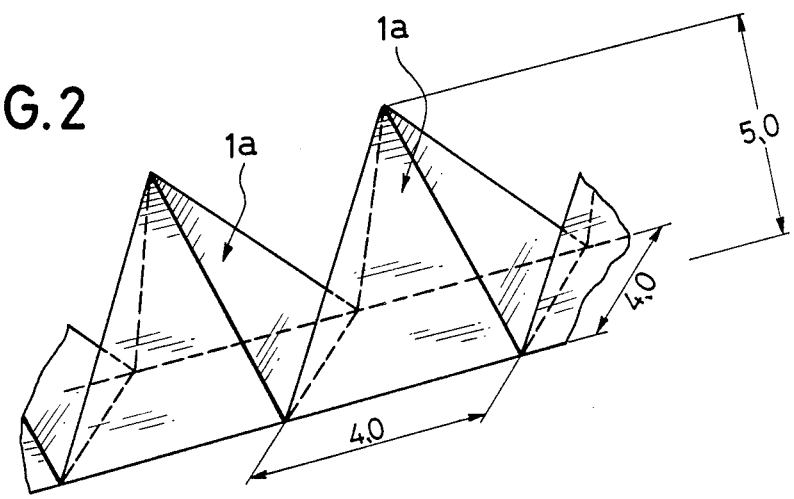
F I G. 3
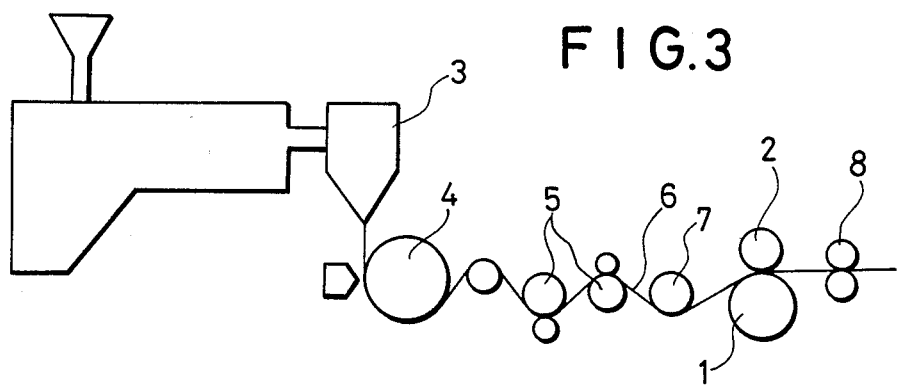

4,978,486

METHOD FOR PREPARING PERFORATED FILM

BACKGROUND OF THE INVENTION (a) Field of the Invention

This invention relates to perforated polyolefin films which films are mainly used in the fields of sanitary, food packaging and industrial materials.

(b) Description of the Prior Art

Since perforated films are permeable to gases and liquids, the films have been recently investigated for use in sanitary materials and other broad areas by utilizing their permeability to gases and liquids.

As to preparation methods of the perforated films used in these areas, methods disclosed in Japanese Laid-Open Patent No. 91486/1978 and Japanese Patent Publication No. 36130/1982 are known. In these methods, films are processed by heating with hot air on the surface of bored drums and then vacuuming the inside of the drums to perforate the films. Although these methods are reliable and effective, equipment is complex and expensive, and processing at a low speed is also inevitable. Accordingly, these methods have a disadvantage of generally leading to high cost.

An improvement of the above methods has been proposed in U.S. Pat. Nos. 4,272,473 and 4,319,868 (Japanese Patent Publication No. 25577/1983). In this method, a film is pinched with pressure on an embossing roll having a large number of protruded portions, followed by pressing with a hot metal roll to perforate the film by the protruded portions. Then the perforated film is pinched again with pressure and cooled. This method is better than the above-mentioned methods but has a low processing speed of about 9.4 m/min., thereby causing high cost. It is also difficult in this method to operate for a long period of time because the perforating effectiveness is reduced by abrasion of the convex surface of the metal rolls.

In addition, a method for opening the recessed portion of the film by orienting a previously embossed film is disclosed in Japanese Patent Publication No. 27097/1983. (See U.S. Pat. Nos. 4,101,358 and 4,144,368.) The method is poor in stretching workability and also has a disadvantage of resulting in enlarged pores.

SUMMARY OF THE INVENTION

The object of this invention is to provide a method for preparing a perforated film having uniform pores with a good productivity rate and low production cost.

The object of this invention is achieved by briefly pressing a length of an oriented polyolefin film against an embossing surface having a plurality of protuberances thereon, while the film is heated to near but below its softening temperature and is constrained from shrinking, under a pressure to form a plurality of pores in the film, which pressure is ineffective to form pores in a corresponding unoriented film and is effective to form at most only a portion of the pores in the corresponding heated oriented film in unconstrained condition.

The object of this invention can also be achieved by preparing a perforated film by a method which comprises a polyolefin film, thermally embossing an at least uniaxially oriented polyolefin film between an embossing roll having a large number of protruded knobs and a pinch roll which presses against said knobs, and simultaneously taking up the resultant film at a rate not less than the processing speed of the embossing roll.

The object of this invention can be more preferably achieved by incorporating a filler to the polyolefin in an amount not more than 400 parts by weight per 100 parts by weight of the polyolefin.

Upon further study of the specification and appended claims, further objects and advantages of this invention will become apparent to those skilled in the art.

BRIEF DESCRIPTION OF THE DRAWINGS

Various other objects, features and attendant advantages of the present invention will be more fully appreciated as the same becomes better understood when considered in conjunction with the accompanying drawings in which like reference characters designate the same or similar parts throughout the several views, and wherein:

FIG. 1 is an oblique projection illustrating an example of the embossing equipment in this invention;

FIG. 2 is an oblique projection illustrating an example of the embossing pattern having tip protruded knobs;

FIG. 3 illustrates an example of the equipment employed in this invention, that is, a line for conducting the uniaxial orientation in the preparation of a film by a usual T-die method.

In these figures, 1 is an embossing roll, 1a are the protruding knobs forming the embossing pattern which form the pores, 2 is a silicone rubber roll, 3 is a T-die, 4 is a cooling roll, 5 is a preheating roll, 6 is an oriented film, 7 is a stretching roll, and 8 is a take-up pinch roll.

DETAILED DESCRIPTION OF THE INVENTION

The method of this invention can provide uniformly perforated films using simpler than conventional equipment with a high production rate and low cost.

The polyolefin used in the method of this invention is thermoplastic homopolymer of a monomer, e.g., ethylene, propylene and butene, a mutual copolymer of said monomer, a copolymer of said monomer with another monomer, such as vinyl acetate, or a polymer blend thereof. A polyolefin having an excellent orienting ability is preferred. Particularly preferred polyolefins are polypropylene (PP), high density polyethylene (HDPE) and linear low density polyethylene (L-LDPE).

Low melting-point resins including petroleum resin and ethylene vinyl-acetate copolymer may be blended in order to carry out the perforation operation more easily. In this blending, it is desired to limit the amount of low melting-point resins so as to not very adversely affect the orientation and strength of the films. The preferred amount is usually 10% or less.

In addition, conventional additives for polyolefins may be added, if necessary, in the method of this invention. Examples of such additives include heat stabilizers, ultraviolet absorbers, antioxidants, antistatic agents, coloring agents and lubricants.

The optional fillers described below are used to promote achievement of the above-stated object of this invention. Both inorganic and organic fillers can be employed. Examples of inorganic fillers include, calcium carbonate, talc, clay, kaolin, silica, diatomaceous earth, magnesium carbonate, barium carbonate, magnesium sulfate, barium sulfate, calcium sulfate, aluminum hydroxide, zinc oxide, magnesium hydroxide, calcium oxide, magnesium oxide, titanium oxide, alumina, mica, calcium silicate, glass powder, silicate balloon, zeolite and acid clay. Particularly preferred fillers are calcium carbonate, talc, clay, silica, diatomaceous earth and barium sulfate. The amount of filler added can range widely, e.g., 0–400, generally 20–400, parts by weight per 100 parts by weight of the polyolefin. The preferred amount is 20–200 parts by weight and the more preferred amount is 50–200 parts by weight. An amount less than 20 parts by weight leads to reduced numbers of pores, even though the stretching ratio is increased, and is hence not effective. On the other hand, an amount more than 400 parts by weight is undesirable because difficulty is caused in the orientation process.

The orientation operation of this invention is required to provide a large number of cracks and micro voids, e.g., between resin and filler particles by stretching the film by 4 times or more in a longitudinal, transverse or biaxial direction. Biaxial orientation is preferred in order to carry out perforation easily and to provide pores having well balanced forms in both longitudinal and transverse directions.

The amount of orientation (stretching) in the above uniaxial orientation is preferably in the range of 4–10, i.e., unoriented film is stretched in one direction from 400 to 1,000%, and more preferably in the range of 4–7. That of the biaxial orientation is preferably in the range of 4–20, i.e., the film area is increased 400 to 2,000% by stretching, and more preferably in the range of 4–15.

The size, shape and height of the protruded knob on the embossing roll can be suitably determined in accordance with the desired size and density of the pores. The knobs shown in FIG. 2 are pyramidal.

The temperature of the embossing roll is suitably between the softening point and melting point of the polyolefin used. A temperature close to the melting point of the polyolefin leads to easier marring for the perforation but promotes tackiness to the roll and tends to cause nonuniformity of film release from the roll. Therefore it is preferred to select the roll temperature on the basis of processing speed so that the film is heated just prior to being embossed to a temperature near, e.g., from 50° to 140° C., preferably 80° to 130° C., but below its melting temperature. For example, when L-LDPE is used as the polyolefin, 110° C. is preferred for a take-up rate of 60 m/min. and 115° C. is preferred for a take-up rate of 100 m/min.

Suitable materials for the embossing roll are metals such as iron, stainless steel and brass. A TEFLON® coating may also be applied on the roll surface in order to improve tackiness of the roll.

A silicone rubber roll is suitable for the pinch roll from a heat resistance view point. The roll preferably has a somewhat higher hardness of 60–75 degrees in Shore hardness for ease of film marring.

In order to open the thus-formed pores readily, it is necessary to immediately release the film from the pressure-embossing point after perforation by the embossing roll and to take up the film under an amount of tension effective to increase the dimensions of the pores produced by the embossing roll and increase the perforated ratio under stable conditions, i.e., the percentage of pores produced by the embossing elements 1a, in order to prevent film breakage, viz., at a rate not less than the processing speed and preferably less than 1.2 times of the processing speed of the embossing roll. A take-up rate less than the processing speed weakens the force which opens the pores due to thermal shrinkage of the film, and uniform perforation cannot be obtained.

FIG. 1 is an oblique projection illustrating an example of a pair of rolls used as the embossing equipment of this invention.

In FIG. 1, 1 is an embossing roll having an external surface in the form of a plurality of protruded knobs, and 2 is a nip roll of rigid rubber such as silicone rubber. The oriented polyolefin film is introduced between the nip of the pair of embossing rolls 1 and 2, where it is subjected to (but constrained from) simultaneous heat shrinkage and perforation to obtain the perforated film.

FIG. 2 is an oblique projection showing an example of an emboss for embossing roll 1 in the form of pyramidal-shaped protruding knobs 1a, for example, a square spindle having a base of 4.0×4.0 mm, a height of 5.0 mm, and a protruded knob with a sharp point on the tip. The pattern can be used by suitably modifying as mentioned above.

FIG. 3 is a schematic drawing illustrating an example of a process which carries out film formation, orientation and perforation of the polyolefin sequentially and continuously by a series of equipment.

The polyolefin extruded from the T-die 3 is cooled and solidified on the cooling roll 4. The resultant film is warmed by the preheat roll 5 to the orientation temperature and oriented by the orientation roll 7. The oriented film 6 is successively introduced into the embossing equipment composed of the pairs of rolls 1 and 2, and take up rolls 8, whose take up rate is from 1.0 to 1.2 times that of embossing roll 1 to obtain the perforated film. Optionally, the perforated film thus obtained may further be set by post-heating means (not shown). Thus, in the above embossing conditions, the oriented film is instantaneously perforated by the marring thereof with the protruded hot knobs 1a on the surface of embossing roll 1 while simultaneously being subjected to (but restrained from) thermal shrinkage.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, if any, cited above and below, and of corresponding Japanese patent application Nos. 204993/1987 and 204994/1987 (the priority documents), are hereby incorporated by reference.

EXAMPLES

Examples 1–6 and Comparative Examples 1–4

Polypropylene (PP) having a melt flow index (MI) of 9 (a product of Mitsui Toatsu Chemicals, Inc.), high density polyethylene (HDPE) having a melt flow index of 1.5 and a density ($\rho$) of 0.96 (a product of Mitsui Petrochemical Industries), linear low density polyethylene (L-LDPE) having a melt flow index of 2.0 and a density of 0.92 (a product of Mitsui Petrochemical Industries) or a mixture of these polymers were used as the polyolefin.

Perforated films were prepared by using the compositions, orientation conditions and embossing conditions illustrated in FIGS. 1–3 and Table 1.

An engraved iron roll 1 having a length of 900 mm and a diameter of 350 mm was used as an embossing roll. The embossing surface of embossing roll 1 has a square spindle-like uniform pattern having a pyramidal protruded knob 1a at the tip, a base of 4.0×4.0 mm and a height of 5.0 mm. Pinch rolls 2 were silicone rubber rolls having a length of 900 mm, a diameter of 150 mm and a Shore hardness of 70 degrees. Pinch pressure of all rolls was 15 kg/cm in line pressure. Results are summarized in Table 1.

film cannot be applied to practical uses. (Comparative Example 4.)

Examples 7–11

Polypropylene (PP) having a melt flow index (MI) of 9 (a product of Mitsui Toatsu Chemicals, Inc.), high density polyethylene (HDPE) having a melt flow index of 1.5 and a density ($\rho$) of 0.96 (a product of Mitsui Petrochemical Industries), linear low density polyethylene (L-LDPE) having a melt flow index of 2.0 and a density of 0.92 (a product of Mitsui Petrochemical Industries) were used as the polyolefin. Calcium carbonate having an average particle size of 1.5 um was

TABLE 1

| Example or Comparative Example | Polyolefin and Composition (wt. %) | Orientation Condition | Orientation Temperature (°C.) | Orientation Ratio (times) | Embossing Temperature (°C.) | Embossing Processing speed (m/min) | Embossing Take-up speed (m/min) | Pore dimension Longitudinal length (mm) | Pore dimension Transverse length (mm) | Perforated ratio* (%) |
|---|---|---|---|---|---|---|---|---|---|---|
| Ex. 1 | PP | longitudinal uniaxial | 120 | 5 | 145 | 60 | 63 | 1.0 | 0.2 | 85 |
| Ex. 2 | HDPE | longitudinal uniaxial | 115 | 7 | 120 | 60 | 63 | 1.5 | 0.3 | 87 |
| Ex. 3 | L-LDPE | longitudinal uniaxial | 90 | 7 | 110 | 60 | 63 | 1.3 | 0.2 | 86 |
| Ex. 4 | L-LDPE | biaxial | 90/120 | 3 × 4 | 110 | 60 | 61 | 1.0 | 0.8 | 92 |
| Ex. 5 | PP/L-LDPE (80/20) | biaxial | 115/130 | 3 × 4 | 135 | 60 | 60 | 0.8 | 0.7 | 91 |
| Ex. 6 | HDPE/L-LDPE (80/20) | biaxial | 110/120 | 3 × 4 | 115 | 60 | 60 | 0.7 | 0.7 | 92 |
| Comp. Ex. 1 | PP | unoriented | — | — | 145 | 60 | 63 | (marring only) | | 0 |
| Comp. Ex. 2 | HDPE | unoriented | — | — | 120 | 60 | 63 | (marring only) | | 0 |
| Comp. Ex. 3 | L-LDPE | unoriented | — | — | 110 | 60 | 63 | (marring only) | | 0 |
| Comp. Ex. 4 | L-LDPE | longitudinal uniaxial | 90 | 7 | 110 | 60 | 57 | 0.4 | 0.1 | 40 |

*Perforated ratio:

$$\frac{\text{Number of pores in 10 cm} \times \text{10 cm area of perforated film}}{\text{Number of marrings in 10 cm} \times \text{10 cm area of perforated film}} \times 100$$

As clearly shown in Table 1, the perforated ratio obtained by uniaxial orientation is 85% or more (Examples 1–3). In the biaxial orientation, the perforated ratio obtained is more than 95%, the pore dimension has a smaller difference between longitudinal and transverse lengths, and the product of longitudinal and transverse lengths (that is, the area of a pore) can be enlarged (Examples 4–6).

On the other hand, the corresponding unoriented film has only marrings caused by embossing and no perforation is found at all (Comparative Examples 1–3). When the tension in take-up after the embossing is low, the perforated ratio is low and pore dimension is very small even though a uniaxially oriented film is used. Thus, the used as the filler.

Perforated films were prepared using the compositions, orientation conditions and embossing conditions illustrated in Table 2.

An engraved iron roll having a length of 900 mm and a diameter of 350 mm was used as the embossing roll. The roll includes a square spindle-like uniform pattern having a protruded knob at the tip, a base of 4.0×4.0 mm and a height of 5.0 mm. Pinch rolls were silicone rubber rolls having a length of 900 mm, a diameter of 150 mm and a hardness of 70 degrees. Pinch pressure of all rolls was 15 kg/cm in line pressure. Results are illustrated in Table 2.

TABLE 2

| Example No. | Composition Polyolefin Polymer | Composition Polyolefin Parts by weight | Composition CaCO3 Parts by weight | Orientation Condition | Orientation Temperature (°C.) | Orientation Ratio (times) | Embossing Temperature (°C.) | Embossing Processing speed (m/min) | Embossing Take-up speed (m/min) | Pore dimension Longitudinal length (mm) | Pore dimension Transverse length (mm) | Perforated ratio (%) |
|---|---|---|---|---|---|---|---|---|---|---|---|---|
| 7 | L-LDPE | 100 | 25 | longitudinal uniaxial | 90 | 7 | 110 | 60 | 63 | 2.1 | 0.6 | 98 |
| 8 | L-LDPE | 100 | 100 | longitudinal uniaxial | 90 | 6 | 110 | 60 | 63 | 2.5 | 0.9 | 100 |
| 9 | L-LDPE | 100 | 100 | biaxial | 90/100 | 3 × 4 | 110 | 60 | 63 | 1.3 | 1.5 | 100 |
| 10 | PP | 100 | 100 | longitudinal uniaxial | 120 | 6 | 145 | 60 | 63 | 1.7 | 0.4 | 100 |
| 11 | HDPE | 100 | 200 | longitudinal uniaxial | 115 | 6 | 120 | 60 | 63 | 2.4 | 0.8 | 100 |

As clearly shown in Table 2, the perforated ratio obtained by uniaxial orientation is 95% or more (Examples 7, 8, 10 and 11). In the case of biaxial orientation, the perforated ratio obtained is almost 100%, the pore dimension has a smaller difference between longitudinal and transverse lengths, and the product of pore longitudinal and transverse lengths (that is, the area of a pore) can be increased (Example 9).

What is claimed is:

1. A method for preparing a perforated film from an at least uniaxially oriented filled polyolefin film containing 20-400 parts by weight of a filler per 100 parts by weight of a polyolefin and oriented at a stretching ratio of not less than 4, which comprises thermally embossing the oriented polyolefin film by passing the film, while heated between its softening temperature and its melting point and while constrained from shrinking, between an embossing roll having a large number of protruded knobs and a pinch roll which presses the film against the knobs so as to cause the free end of the knobs to penetrate the film and form pores therein, while simultaneously taking up the resultant film at a rate not less than the processing speed of the embossing roll, thereby increasing the dimensions of the pores.

2. The method of claim 1, wherein the polyolefin film is a homopolymer, copolymer or polymer blend thereof of polypropylene, high-density polyethylene or low-density polyethylene.

3. The method of claim 1, wherein the amount of the filler is 20-200 parts by weight.

4. The method of claim 1, wherein the filler is selected from the group consisting of calcium carbonate, talc, clay, silica, diatomaceous earth and barium sulfate.

5. The method of claim 1, wherein the pinch roll is a silicone rubber roll.

6. The method of claim 1, wherein the film is biaxially oriented.

7. The method of claim 1, wherein the embossing roll is heated to a temperature between the softening temperature and the melting temperature of the polyolefin.

8. The method of claim 1, wherein the polyolefin film is a homopolymer, copolymer or polymer blend thereof of polypropylene, high-density polyethylene or low-density polyethylene, and contains 20-200 parts per 100 parts of the olefin of a filler selected from the group consisting of calcium carbonate, talc, clay, silica, diatomaceous earth and barium sulfate.

9. The method of claim 1, which comprises the step of orienting the polyolefin film uniaxially in the longitudinal or transverse direction or uniaxially, at a stretching ratio of not less than 4.

10. The method of claim 1, wherein the orientation is uniaxial in the range of 4-10.

11. The method of claim 1, wherein the orientation is biaxial in the range of 4-20.

12. The method of claim 1, wherein the rate of taking up is from 1.0 to 1.2 times the speed of the embossing roll.

13. The method of claim 1, wherein the starting oriented film is produced by extrusion molding the polyolefin into an unoriented film and stretch orienting the resulting unoriented film in a continuous multi-step operation.

14. The method of claim 13, wherein the polyolefin film contains 50-200 parts by weight of a filler per 100 parts by weight of a polyolefin.

15. The method of claim 14, wherein the filler is selected from the group consisting of calcium carbonate, talc, clay, silica, diatomaceous earth and barium sulfate.

16. The method of claim 15, wherein the polyolefin film is a homopolymer, copolymer or polymer blend thereof of polypropylene, high-density polyethylene or low-density polyethylene.

17. The method of claim 14, wherein the polyolefin film is a homopolymer, copolymer or polymer blend thereof of polypropylene, high-density polyethylene or low-density polyethylene, and contains 20-200 parts per 100 parts of the olefin of a filler selected from the group consisting of calcium carbonate, talc, clay, silica, diatomaceous earth and barium sulfate, wherein the pinch roll is a silicone rubber roll, and wherein the rate of taking up is from 1.0 to 1.2 times the speed of the embossing roll.

* * * * *